the piston provide valve seats. Two of these concentric ridges are engaged by a flexible disc valve 42 clamped at its center portion between the piston 30 and a rigid backing plate 43 on the piston rod and yieldably urged upon said ridges to close the corresponding ends of the piston passages 40. An opening in the disc valve 42 maintains the adjacent ends of piston passages 41 open. Another flexible disc valve 45, also clamped at its central portion between the piston 30 and the clamping nut 46 threaded to rod 33, is yieldably urged against an annular valve seat on the piston by the spring 47 resting upon an annular flange on nut 46. Valve 45 covers the adjacent ends of the piston passages 41. Both flexible disc valves 42 and 45 may be provided with constantly open orifices if certain riding qualities are to be provided by the shock absorber, however, in order that the upper cylinder chamber 31 is assured of being filled with fluid and never starved it is essential that at least one valve, viz. 42 be provided with a constantly open orifice 48 so that the pressure drop through the downwardly moving piston is always less than the pressure drop through the valve mechanism in cage 21.

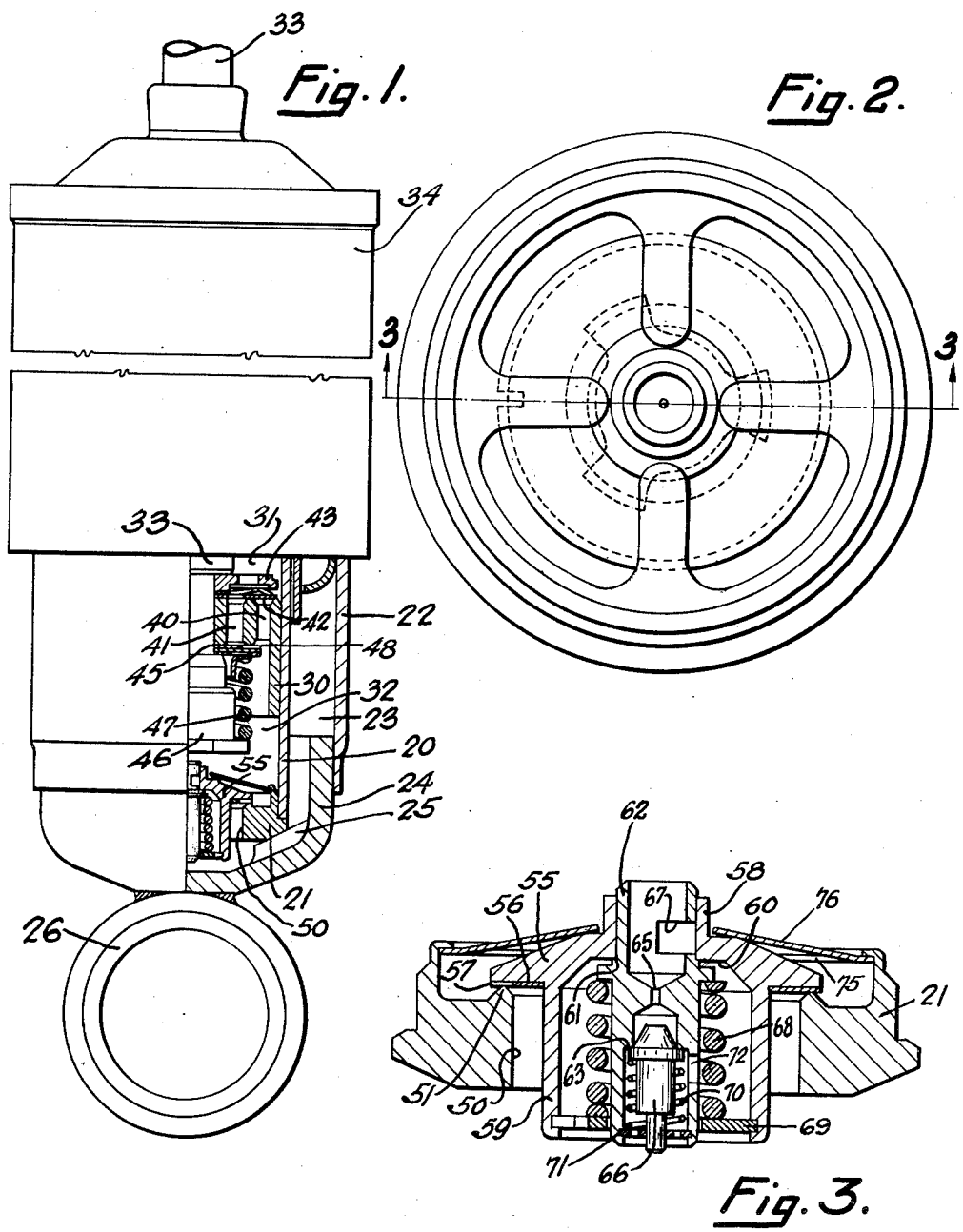

United States Patent Office 2,695,034

Patented Nov. 23, 1954

2,695,034

SHOCK ABSORBER VALVE

George A. Brundrett and Mearick Funkhouser, Dayton, Ohio, assignors to General Motors Corporation, Detroit, Mich., a corporation of Delaware Application June 29, 1951, Serial No. 234,205

2 Claims. (Cl. 137—493.4)

This invention relates to improvements in fluid flow control devices particularly adapted for use in direct acting, hydraulic shock absorbers.

It is among the objects of the present invention to provide a unitary, fluid flow control mechanism particularly adapted for a direct acting type hydraulic shock absorber, which will restrict the circulating flow of fluid within the shock absorber causing said shock absorber to provide the desired resistance to relative movements of the members between which the shock absorber is connected.

Shock absorbers equipped with the present invention and connected between the frame and axles of a vehicle will properly resist the relative movements of the vehicle frame and axles when the vehicle is being operated either over a comparatively smooth road bed or over an irregular surface at high or low speeds and thereby provide a comfortable and smooth ride under all operating conditions.

The control device of the present invention is a unitary structure capable of being assembled and tested before final assembly into the shock absorber. All parts are sturdily constructed so as to be capable of positive action thereby avoiding the variables of preloaded, thin, flexible disc valves.

Further objects and advantages of the present invention will be apparent from the following description, reference being had to the accompanying drawings wherein a preferred embodiment of the present invention is clearly shown.

In the drawings:

Fig. 1 is a partial, longitudinal sectional view of a direct acting type, hydraulic shock absorber equipped with the present invention.

Fig. 2 is an enlarged, top plan view of the improved control mechanism.

Fig. 3 is a sectional view of the mechanism, taken along the line and in the direction of the arrows 3—3 of Fig. 2.

Referring to the drawings and particularly to Fig. 1 thereof, the shock absorber equipped with the present invention consists of a work cylinder 20 provided with the usual closure member at one end (not shown) and another closure member at the opposite end, this closure member being the fluid flow control mechanism of the present invention and consisting of a housing or valve cage 21 constructed as to fit telescopicaly into the end of the cylinder 20. A tubular member 22 surrounds the cylinder 20 so as to provide an annular space forming the fluid reservoir 23. An end cap 24 has the one end of tube 22 secured thereto, said end cap having spaced, interior ribs 25 upon which the valve cage 21 rests. An attachment ring 26 is secured to the end cap 24 and provides means by which the one end of the shock absorber may be anchored to the axle of the vehicle equipped with these shock absorbers.

A reciprocative piston 30 divides the cylinder 20 into upper and lower working chambers 31 and 32 respectively. A piston rod 33 has its one end secured to the piston 30 and extends through the upper closure member of the cylinder to the exterior thereof. To this rod is attached a guard tube 34 which encompasses the shock absorber for a portion of its length.

A plurality of passages are provided in the piston 30 for the transfer of fluid therethrough. These passages are arranged in two groups. One group 40 is arranged in a circular row outside the other group 41 also arranged in a circular row. Annular ridges on each end of the The fluid flow control mechanism in the valve cage or cylinder closure member 21 cooperates with the valved passages in the piston to provide proper control of fluid transfer in the shock absorber, so that said shock absorber may function properly to resist movements of the members between which the shock absorber is connected. The valve cage 21 fits telescopically into the cylinder 20 and rests upon the ribs 25 in the end cap 24. A central aperture 50 in the valve cage provides communication between the fluid reservoir 23 and the cylinder working chamber 32. This aperture 50 is surrounded by an annular ridge 51 on the side of the valve cage facing the cylinder chamber 32. This ridge 51 forms a seat normally engaged by the disc valve 55. In the drawing Fig. 3, the disc valve 55 has a ring shaped liner 56 on its surface adjacent the seat 51, said liner having a notch 57 forming a predeterminately sized, constantly open orifice. The liner 56 may be dispensed with and the disc valve 55 may directly engage the valve seat 51, however, if an orifice 57 would be considered desirable in this instance, cutting or forming the notch in the rigid disc valve would be an expensive operation particularly in commercial production and therefore the provision of a notched, thin metal liner 56 as illustrated is more practical and less expensive. The disc valve 55 has two cylindrical extensions 58 and 59, the former extending from the side of the valve facing the cylinder chamber 32, the latter from the opposite side of the valve into the aperture 50 of the valve cage and being of lesser diameter outside than the inside diameter of said aperture. These two cylindrical extensions are of different inside diameters thus providing a ledge 60 which forms a seat normally engaged by an annular flange 61 provided on the pressure relief valve 62, one end of which is slidably supported within the cylindrical extension 58 of the disc valve 55. Each end of the plug type pressure relief valve 62 is axially recessed, both recessed portions being in communication with each other through a constricted portion providing a predeterminately sized orifice 65. The wall of the recessed end of valve 62 has an opening 67 which, as shown in Fig. 3, is normally within the confines of the cylindrical extension 58 of valve 55 and therefore ineffective for fluid passage therethrough. The recess in the opposite end of valve 62 has a reduced diameter inner end forming an annular ledge 63 which provides a seat normally engaged by an outwardly extending annular flange on the check valve 66.

The pressure relief or plug valve 62 is yieldingly maintained in engagement with the ledge or seat 60 in valve 55 by a spring 68 interposed between the flange on valve 62 and an apertured abutment member 69 secured within the cylindrical extension 59 of valve 55. The check valve 66 is yieldably maintained in engagement with the ledge or seat 63 in the pressure relief valve 62 by a spring 70, interposed between the annular flange on said check valve and an abutment member 71 secured in the pressure relief valve 62. A side opening 72 in the wall of the recessed end of valve 62 provides an exit for fluid flowing past check valve 66 when it is pressure actuated to disengage ledge 63.

A ring member 75 is secured in the valve cage 21 in any suitable manner, said ring having inwardly extending resilient fingers 76 which engage disc valve 55 and are normally flexed yieldably to maintain said valve in normal engagement with the annular seat 51 on the valve cage. The inner ends of fingers 76 are in close proximity to the cylindrical extension 58 of valve 55 so as to maintain the said valve 55 substantially concentric of the aperture 50 in the valve cage.

The control mechanism of the present invention is completely assembled before being secured within the shock absorber and thus may be tested prior to its application to the shock absorber for which it is intended. When the piston 30 in cylinder 20 is moved upwardly, it exerts pressure upon the fluid in the rod containing working chamber 31, causing the fluid to be forced from said chamber through the piston passages 41 past the valve 45 flexed out of seating engagement with the piston by this fluid pressure, into chamber 32 of the cylinder. The capacity of chamber 31, due to the presence of the rod 33 therein, is less than the capacity of the chamber 32 and therefore chamber 32 requires additional fluid to fill it. This additional fluid is supplied from the reservoir 23 by the bodily lifting of valve 55 from engagement with its seat 51 on the valve cage 21 against the opposing effect of the resilient fingers 76. This movement of valve 55 carries with it valve 62 in valve 55 and also valve 66 in valve 62. Thus it may be said that the unitary structure embodying valves 55, 62 and 66 moves as a unit to establish a flow from the reservoir 23 into the cylinder chamber 32. The restriction by valve 45 to fluid flow through the piston passages 41 either by successive flows through an orifice in valve 45 and then the flexing of said valve or, if no orifice is provided, by the aperture provided by the flexed valve, causes the shock absorber to provide the resistance to separating movements of the members between which the shock absorber is connected.

Movement of the piston 30 in the opposite direction exerts pressure upon the fluid in cylinder chamber 32. The first fluid discharge from chamber 32 in response to downward movement of the piston 30 is established through the constantly open orifice 57 in the disc valve 55, through valve cage aperture 50 into the reservoir 23, and also through the piston passages 40 and the constantly open orifice 48 in valve 45 into the cylinder chamber 31. When the combined fluid flows established by orifices 57 and 48 cannot properly relieve the fluid pressure in cylinder chamber 32, this fluid pressure acting through valve 62 and its orifice 65 against valve 66, moves said valve against the opposing effect of spring 70 thereby rendering orifice 65 effective to establish a third constantly restricted fluid pressure relieving flow from cylinder chamber 32, this last flow being directed to the fluid reservoir 23. When the fluid pressure in chamber 32 is increased so that it cannot be relieved by the combined flows established by orifices 57, 48 and 65, then valve 42 is flexed to move from its seat on piston 30 and thereby establishes another fluid pressure relieving flow from cylinder chamber 32 into cyilnder chamber 31.

Chamber 31, due to the presence of rod 33 therein, is not of sufficient capacity to receive the full fluid displacement from chamber 32 by the descending piston 30 and therefore fluid displaced by the rod in chamber 31, under pressure will, when said pressure reaches a value not relievable by the orifices 57 and 65, cause the pressure relief valve 62 to be actuated against the opposing effect of spring 68 to move the side opening 67 out of the confines of the cylindrical extension 58 of valve 55 and thus establish a pressure relieving fluid flow from chamber 32 through valve 62 and its opening 67, cylindrical extension 59 of valve 55 to the reservoir 23.

It will, of course, be understood that numerous factors enter into the problem of producing shock absorbers which will adequately control the relative movements of the frame and axles of a vehicle to produce a comfortable and smooth ride under all road conditions. The weight of the vehicle, the character of its spring suspension, the viscosity of the fluid used in the shock absorber and the permissible size of the shock absorber are some of the governing factors which require particular variations in valve characteristics, spring rates, orifice sizes and even fluid passage areas to produce a shock absorber adapted efficiently to perform the work in the desired manner. Thus the present shock absorber, to meet specified requirements may have the sizes of its orifices 48, 57 or 65 altered, the rates of springs 47, 68 or 70 changed, the flexibility or thickness of valves 42 or 45 increased or decreased, the sizes of fluid passages 40 or 41 varied or viscosity of the fluid changed.

While the embodiment of the present invention as herein disclosed, constitutes a preferred form, it is to be understood that other forms might be adopted.

What is claimed is as follows:

1. A two way valve mechanism comprising, a valve cage having a central opening in said cage for controlling fluid flow through said valve cage, a compound valve including a disc valve having a central opening therein and engaging the valve cage to close the said opening, said disc valve having a constantly open orifice for restricted fluid flow through the disc valve; a plug valve slidably supported in the central opening of the disc valve and having means engaging the disc valve normally to close the said central opening therein; means yieldably urging the plug valve into engagement with the disc valve; a recess in each end of the plug valve, said recesses being in communication with each other through a predeterminately sized orifice in the plug valve for restricted fluid flow through the plug valve; valve means in the one recess of the plug valve yieldably urged normally to render the orifice in the plug valve ineffective; and resilient retainer means supported in the valve cage and engaging the disc valve yieldably to hold the disc valve upon the valve cage and to maintain it central of the opening in said disc valve.

2. A fluid flow control mechanism comprising a valve cage having a central opening therein and provided with a valve seat around the said opening, a disc valve centrally positioned of said cage and yieldably urged upon said valve seat normally to close said central valve cage opening and movable in one direction to establish a substantially unrestricted flow of fluid through the valve cage, said disc valve having an orifice effective when the valve engages the cage to establish a predeterminately restricted fluid flow through the cage, said disc valve having a central recess therein with a central passage from the same for fluid flow through the said valve, a pressure relief valve supported centrally in said recess and yieldably urged to close said passage, said relief valve, when moved by fluid pressure, establishing a restricted fluid flow through the disc valve in a direction opposite the flow established by the movement of said disc valve; said relief valve having a central recess therein with a central fluid flow restricting passage from the same for restricted fluid flow through said relief valve; and a spring loaded valve centrally in the relief valve normally closing the relief valve orifice but operative at a predetermined pressure to render the said orifice effective to establish a fluid flow thru the relief valve.

References Cited in the file of this patent

UNITED STATES PATENTS

| Number | Name | Date |
|---|---|---|
| 1,835,110 | Bates | Dec. 8, 1931 |
| 2,026,769 | Bates | Jan. 7, 1936 |
| 2,087,451 | Rossman et al. | July 20, 1937 |
| 2,148,839 | Rossman et al. | Feb. 28, 1939 |
| 2,159,289 | Nickelson | May 23, 1939 |
| 2,467,098 | Rossman et al. | Apr. 12, 1949 |
| 2,583,169 | Funkhouser | Jan. 22, 1952 |
| 2,616,711 | Whisler | Nov. 4, 1952 |